(12) United States Patent
Xue et al.

(10) Patent No.: US 12,411,804 B2
(45) Date of Patent: Sep. 9, 2025

(54) DATA COMPACTION METHOD AND DEVICE

(71) Applicant: SAMSUNG ELECTRONICS CO., LTD., Suwon-si (KR)

(72) Inventors: Kun Xue, XiAn (CN); Fei Dong, XiAn (CN); Yangxu Zhou, XiAn (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/635,755

(22) Filed: Apr. 15, 2024

(65) Prior Publication Data

US 2024/0394221 A1 Nov. 28, 2024

(30) Foreign Application Priority Data

May 26, 2023 (CN) .......................... 202310612577.7

(51) Int. Cl.
*G06F 17/00* (2019.01)
*G06F 7/00* (2006.01)
(Continued)

(52) U.S. Cl.
CPC ............... *G06F 16/13* (2019.01); *G06F 7/16* (2013.01); *G06F 16/185* (2019.01)

(58) Field of Classification Search
CPC ........... G06F 16/13; G06F 16/185; G06F 7/16
(Continued)

(56) References Cited

U.S. PATENT DOCUMENTS

| 11,042,328 B2 | 6/2021 | Choi et al. |
| 11,256,515 B2 | 2/2022 | Kulkarni et al. |

(Continued)

FOREIGN PATENT DOCUMENTS

| CN | 109783020 A | 5/2019 |
| CN | 112000846 A | 11/2020 |
| CN | 113553476 A | 10/2021 |

OTHER PUBLICATIONS

Lepers et al., "KVell: the Design and Implementation of a Fast Persistent Key-Value Store," SOSP'19, Proceedings of the 27th ACM Symposium on Operating Systems Principles, pp. 447-461, Oct. 2019.

(Continued)

*Primary Examiner* — Pavan Mamillapalli
(74) *Attorney, Agent, or Firm* — Sughrue Mion, PLLC

(57) ABSTRACT

Provided is a data compaction method that includes: determining, by an electronic device, a plurality of Sorted String Table (SSTable) files on which a compaction operation is to be performed among SSTable files stored in a storage device connected to the electronic device, the data in the SSTable files stored in the storage device is stored based on a Log Structured Merge Tree (LSM-Tree) mechanism; based on receiving the plurality of SSTable files from the storage device, performing, by the electronic device, merge sorting on data in data blocks of the plurality of SSTable files based on indexes of the data in the data blocks of the plurality of SSTable files, to obtain reconstructed data blocks; and sending, by the electronic device, the reconstructed data (Continued)

blocks to the storage device, the reconstructed data blocks being used by the storage device to obtain reconstructed SSTable files.

17 Claims, 13 Drawing Sheets

(51) Int. Cl.
    *G06F 7/16*        (2006.01)
    *G06F 16/13*      (2019.01)
    *G06F 16/185*     (2019.01)

(58) Field of Classification Search
    USPC .......................................................... 707/693
    See application file for complete search history.

(56) References Cited

U.S. PATENT DOCUMENTS

| | | |
|---|---|---|
| 11,347,698 B2 | 5/2022 | Fretz et al. |
| 2015/0310053 A1* | 10/2015 | Kim ...................... G06F 3/0638 707/696 |
| 2018/0300205 A1* | 10/2018 | Sehgal ................ G06F 11/1451 |
| 2018/0307711 A1* | 10/2018 | Kulkarni ................ G06F 16/215 |
| 2020/0183905 A1* | 6/2020 | Wang .................. G06F 16/2246 |
| 2020/0379775 A1* | 12/2020 | Kulkarni .................. G06F 16/00 |
| 2021/0004177 A1 | 1/2021 | Lee et al. |
| 2022/0382760 A1* | 12/2022 | Pang ................... G06F 16/2246 |

OTHER PUBLICATIONS

Zhang et al., "FPGA-Accelerated Compactions for LSM-based Key-Value Store," Proceedings of the 18th USENIX Conference on File and Storage Technologies (FAST '20), pp. 225-237, total 15 pages, Feb. 2020.

Lu et al., "WiscKey: Separating Keys from Values in SSD-Conscious Storage," Proceedings of the 14th USENIX Conference on File and Storage Technologies (FAST '16), pp. 133-148, total 17 pages, Feb. 2016.

Ruan et al., "INSIDER: Designing In-Storage Computing System for Emerging High-Performance Drive," Proceedings of the 2019 USENIX Annual Technical Conference, pp. 379-394, total 17 pages, Jul. 2019.

Picoli et al., "LSM Management on Computational Storage," DAMON '19, total 3 pages, Jun. 2018.

Vinçon et al., "nKV: Near-Data Processing with KV-Stores on Native Computational Storage," DAMON'20, total 11 pages, Jun. 2020.

Sun et al., "FPGA-based Compaction Engine for Accelerating LSM-tree Key-Value Stores," 2020 IEEE 36th International Conference on Data Engineering (ICDE), pp. 1261-1272, 2020.

* cited by examiner

DATA COMPACTION METHOD AND DEVICE

CROSS-REFERENCE TO RELATED APPLICATION(S)

This application is based on and claims priority under 35 U.S.C. § 119 to Chinese Patent Application No. 202310612577.7, filed on May 26, 2023, in the China National Intellectual Property Administration, the disclosure of which is incorporated herein by reference in its entirety.

BACKGROUND

1. Field

The disclosure relates to data processing, and more specifically, to a data compaction method and device.

2. Related Art

A Log Structured Merge Tree (LSM-Tree) is a widely used data storage structure. As illustrated in FIG. 1, random writing are converted to sequential writes by performing multi-level compaction on data in Sorted Strings Tables (SSTables), thereby achieving high read and write performance. However, multiple reading and writing for data by compaction operations over a lifetime of the data cause a significant reading and writing amplification, which degrades application performance on a host and may shorten a lifetime of a storage device (e.g., a Solid State Drive (SSD)). In addition, frequent index processing and data merging performed by multiple compaction processes may cause a central processing unit (CPU) contention, and performing compaction operations frequently on the CPU consume a large amount of transfer resources, which may cause a data transfer delay.

SUMMARY

Provided are a data compaction method and device capable of reducing host-side resource usage and reducing data processing delay when performing compaction operations on data stored based on Log Structured Merge (LSM).

According to an aspect of an embodiment, a data compaction method includes: determining, by an electronic device, a plurality of Sorted String Table (SSTable) files on which a compaction operation is to be performed among SSTable files stored in a storage device connected to the electronic device, the data in the SSTable files stored in the storage device is stored based on a Log Structured Merge Tree (LSM-Tree) mechanism; based on receiving the plurality of SSTable files from the storage device, performing, by the electronic device, merge sorting on data in data blocks of the plurality of SSTable files based on indexes of the data in the data blocks of the plurality of SSTable files, to obtain reconstructed data blocks; and sending, by the electronic device, the reconstructed data blocks to the storage device, the reconstructed data blocks are used by the storage device to obtain reconstructed SSTable files, each SSTable file includes a data block and an index block, and indexes in each index block correspond to data in the data block corresponding to the index block.

According to an aspect of an embodiment a data compaction method performed by a storage device, includes: parsing index blocks of a plurality of Sorted String Table (SSTable) files on which a compaction operation is to be performed, the plurality of SSTable files stored based on a Log Structured Merge Tree (LSM-Tree) mechanism in the storage device, to obtain indexes of data in data blocks of the plurality of SSTable files; sending the indexes of the data in the data blocks of the plurality of SSTable files to an electronic device to perform merge sorting on the data in the data blocks of the plurality of SSTable files and obtain reconstructed data blocks; performing index reconstruction on data in the reconstructed data blocks to obtain reconstructed index blocks corresponding to the reconstructed data blocks; and stitching each of the reconstructed data blocks and a corresponding index block among the reconstructed index blocks to obtain a reconstructed SSTable file.

According to an aspect of an embodiment an electronic device includes: a determining unit configured to determine a plurality of Sorted String Table (SSTable) files on which a compaction operation is to be performed among SSTable files stored in a storage device, the data in the SSTable files stored in the storage device is stored based on a Log Structured Merge Tree (LSM-Tree) mechanism; a merge sorting unit configured to perform merge sorting on data in data blocks of the plurality of SSTable files based on indexes of the data in the data blocks of the plurality of SSTable files received from the storage device, to obtain reconstructed data blocks; and a sending unit configured to send the reconstructed data blocks to the storage device, the reconstructed data blocks are used by the storage device to obtain reconstructed SSTable files, each SSTable file includes a data block and an index block, the indexes in each index block correspond to data in a data block corresponding to the index block.

According to an aspect of an embodiment, the electronic device further includes the storage device including: a parsing unit configured to parse index blocks of the plurality of SSTable files on which the compaction operation is to be performed, to obtain indexes of data in data blocks of the plurality of SSTable files, a sending unit configured to send the indexes of the data in the data blocks of the plurality of SSTable files to the electronic device, to perform merge sorting on the data in the data blocks of the plurality of SSTable files and obtain reconstructed data blocks, an index reconstruction unit configured to perform index reconstruction on data in the reconstructed data blocks to obtain reconstructed index blocks corresponding to the reconstructed data blocks, and a stitching unit configured to stitch each of the reconstructed data blocks and a corresponding index block among the reconstructed index blocks to obtain a reconstructed SSTable files.

According to an aspect of an embodiment a storage device includes: a parsing unit configured to parse index blocks of a plurality of Sorted String Table (SSTable) files on which a compaction operation is to be performed, the plurality of SSTable files stored based on a Log Structured Merge Tree (LSM-Tree) mechanism in the storage unit, to obtain indexes of data in data blocks of the plurality of SSTable files; a sending unit configured to send the indexes of the data in the data blocks of the plurality of SSTable files to an electronic device to perform merge sorting on the data in the data blocks of the plurality of SSTable files and obtain reconstructed data blocks; an index reconstruction unit configured to perform index reconstruction on data in the reconstructed data blocks to obtain reconstructed index blocks corresponding to the reconstructed data blocks; and a stitching unit configured to stitch each of the reconstructed data blocks and a corresponding index block among the reconstructed index blocks to obtain a reconstructed SSTable file.

According to an aspect of an embodiment an electronic device includes: a memory storing at least one instruction; at least one storage device; and at least on processor configured to execute the at least one instruction to: determine a plurality of Sorted String Table (SSTable) files on which a compaction operation is to be performed among SSTable files stored in the at least one storage device, the data in the SSTable files stored in the at least one storage device is stored based on a Log Structured Merge Tree (LSM-Tree) mechanism; based on receiving the plurality of SSTable files from the at least one storage device, perform merge sorting on data in data blocks of the plurality of SSTable files based on indexes of the data in the data blocks of the plurality of SSTable files, to obtain reconstructed data blocks; and sending the reconstructed data blocks to the at least one storage device, the reconstructed data blocks are used by the at least one storage device to obtain reconstructed SSTable files, each SSTable file includes a data block and an index block, and indexes in each index block correspond to data in a data block corresponding to the index block.

According to an aspect of an embodiment a host storage system includes: a host comprising a host memory and a host controller, the host memory storing at least one instruction; and a storage device, the host controller is configured to execute the at least on instruction to: parse index blocks of a plurality of Sorted String Table (SSTable) files on which a compaction operation is to be performed, the plurality of SSTable files stored based on a Log Structured Merge Tree (LSM-Tree) mechanism in the storage device, to obtain indexes of data in data blocks of the plurality of SSTable files; send the indexes of the data in the data blocks of the plurality of SSTable files to an electronic device to perform merge sorting on the data in the data blocks of the plurality of SSTable files and obtain reconstructed data blocks; perform index reconstruction on data in the reconstructed data blocks to obtain reconstructed index blocks corresponding to the reconstructed data blocks; and stitch each of the reconstructed data blocks and a corresponding index block among the reconstructed index blocks to obtain a reconstructed SSTable file.

According to an aspect of an embodiment a Universal Flash Storage (UFS) system includes: a UFS host configured to: determine a plurality of Sorted String Table (SSTable) files on which a compaction operation is to be performed among SSTable files stored in a UFS device, the data in the SSTable files stored in the UFS device is stored based on a Log Structured Merge Tree (LSM-Tree) mechanism, based on receiving the plurality of SSTable files from the UFS device, perform merge sorting on data in data blocks of the plurality of SSTable files based on indexes of the data in the data blocks of the plurality of SSTable files, to obtain reconstructed data blocks, and sending the reconstructed data blocks to the UFS device, the reconstructed data blocks are used by the UFS device to obtain reconstructed SSTable files, each SSTable file includes a data block and an index block, and indexes in each index block correspond to data in a data block corresponding to the index block; the UFS device configured to: parse each index block of the plurality of SSTable files on which the compaction operation is to be performed, to obtain indexes of data in data blocks of the plurality of SSTable files, send the indexes of the data in the data blocks of the plurality of SSTable files to the UFS host to perform merge sorting on the data in the data blocks of the plurality of SSTable files and obtain reconstructed data blocks, perform index reconstruction on data in the reconstructed data blocks to obtain reconstructed index blocks corresponding to the reconstructed data blocks, and stitch each of the reconstructed data blocks and a corresponding index block among the reconstructed index blocks to obtain a reconstructed SSTable file; and a UFS interface for a communication between the UFS device and the UFS host.

According to an aspect of an embodiment a data center system includes: a plurality of application servers, each of the plurality of application servers is configured to perform a first data compaction method; and plurality of storage servers, each storage server includes a storage device, and each storage server is configured to perform a second data compaction method, the first data compaction method includes: determining a plurality of Sorted String Table (SSTable) files on which a compaction operation is to be performed among SSTable files stored in a storage device, the data in the SSTable files stored in the storage device is stored based on a Log Structured Merge Tree (LSM-Tree) mechanism, based on receiving the plurality of SSTable files from the storage device, performing merge sorting on data in data blocks of the plurality of SSTable files based on indexes of the data in the data blocks of the plurality of SSTable files, to obtain reconstructed data blocks, and sending the reconstructed data blocks to a storage server comprising the storage device, the reconstructed data blocks are used by the storage device to obtain reconstructed SSTable files, each SSTable file includes a data block and an index block, and indexes in each index block correspond to data in the data block corresponding to the index block, and the second data compaction method includes: parsing each index block of the plurality of SSTable files on which the compaction operation is to be performed, to obtain indexes of data in data blocks of the plurality of SSTable files; sending the indexes of the data in the data blocks of the plurality of SSTable files to an application server to perform merge sorting on the data in the data blocks of the plurality of SSTable files and obtain reconstructed data blocks; performing index reconstruction on data in the reconstructed data blocks to obtain reconstructed index blocks corresponding to the reconstructed data blocks; and stitching each of the reconstructed data blocks and a corresponding index block among the reconstructed index blocks to obtain a reconstructed SSTable file.

According to an aspect of an embodiment a non-transitory computer readable storage medium for storing computer readable program code or instructions which are executable by a processor to perform a method for compacting data, the method includes: determining a plurality of Sorted String Table (SSTable) files on which a compaction operation is to be performed among SSTable files stored in a storage device connected to an electronic device, the data in the SSTable files stored in the storage device is stored based on a Log Structured Merge Tree (LSM-Tree) mechanism, each SSTable file includes a data block and an index block, and indexes in each index block correspond to data in the data block corresponding to the index block; performing merge sorting on data in data blocks of the plurality of SSTable files based on indexes of the data in the data blocks of the plurality of SSTable files, to obtain reconstructed data blocks, the reconstructed data blocks are used by the storage device to obtain reconstructed SSTable files; parsing each index block of the plurality of SSTable files on which the compaction operation is to be performed, to obtain indexes of data in data blocks of the plurality of SSTable files, the indexes of the data in the data blocks of the plurality of SSTable files are used by the electronic device to perform merge sorting on the data in the data blocks of the plurality of SSTable files and obtain reconstructed data blocks; performing index reconstruction on data in the reconstructed data blocks to obtain reconstructed index blocks corresponding to the reconstructed data blocks; and stitching each of the reconstructed data blocks and a corresponding index block among the reconstructed index blocks to obtain a reconstructed SSTable file.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
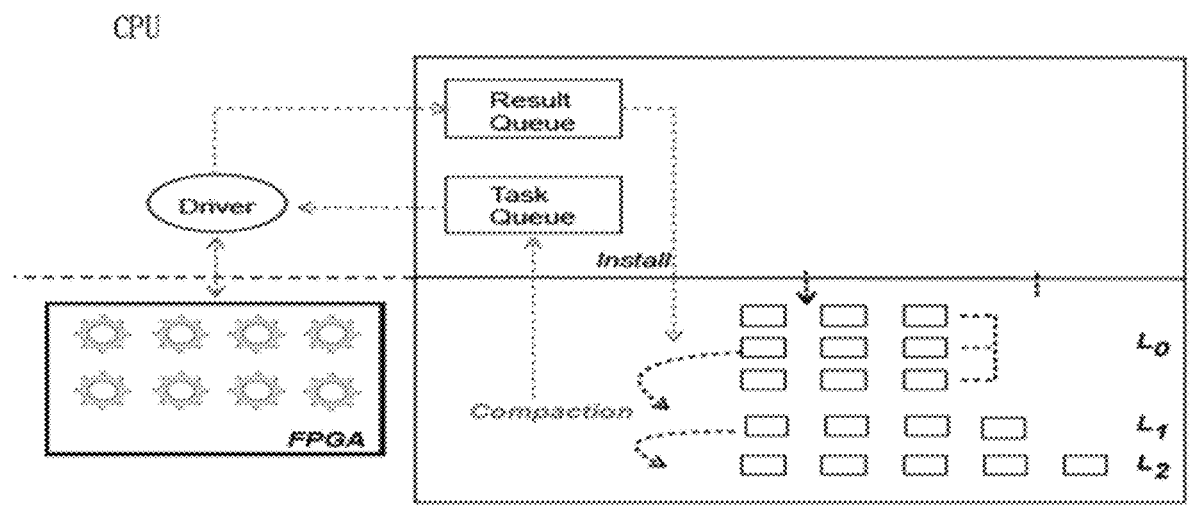
FIG. 1 illustrates a schematic diagram of a method of offloading compaction operations by a Field Programmable Gate Array (FPGA), according to one or more embodiments.

Some aspects of the embodiments may improve performance on a host and reduce data transfer delay during a compaction operation performed by the host.

Hereinafter, various example embodiments of the present disclosure are described with reference to the accompanying drawings, in which like reference numerals are used to depict the same or similar elements, features, and structures. However, the present disclosure is not intended to be limited by the various embodiments described herein to a specific embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include," "include," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various embodiments of the present disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain embodiments of the present disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

When a compaction operation is performed on SSTable files stored in a storage device based on an LSM-Tree, the SSTable files on which the compaction operation is to be performed are transmitted to a host, and then the host performs merge sorting on data in the received SSTable files to obtain a reconstructed data block, creates an index block corresponding to the reconstructed data block, and then stitches the reconstructed data block and the index block corresponding to the reconstructed data block together to reconstruct a new SSTable file, thereby completing the compaction operation.

The transferring for data needs to occupy transfer resources and the compression operation needs to occupy CPU resources, which will increase delay of the compaction operation when the transfer resources and CPU resources are insufficient.

In order to reduce a data transfer delay and reduce occupation for the CPU resources of the host, the existing methods mainly include:

1) Method of Offloading Compaction Operations by an FPGA

FIG. 1 illustrates a schematic diagram of a method of offloading compaction operations by an FPGA according to one or more embodiments. Referring to FIG. 1, compaction tasks in a compaction task queue are sent to the FPGA, the FPGA performs a compaction operation on the SSTable files and returns result data of the compaction operation to the host. However, although a computing pressure on the CPU is relieved by executing the compaction operation through the FPGA, a new computing hotspot is triggered at the FPGA. Since computing resources of the FPGA are usually much less than those of the CPU, compaction performance is limited by computing resources of an FPGA chip, which may lead to a data processing delay. In addition, this method needs to transfer Key-Value data from a disk to a memory first, and then transfer the data from the memory to the FPGA to be used for compaction processing, which not only does not reduce an amount of data transferred between the disk and the memory, but also increases a data transfer path from the memory to the FPGA, and still cannot solve bottleneck limitation for a data transfer bandwidth.

2) Key-Value (KV) Separation Method

Figure 2:
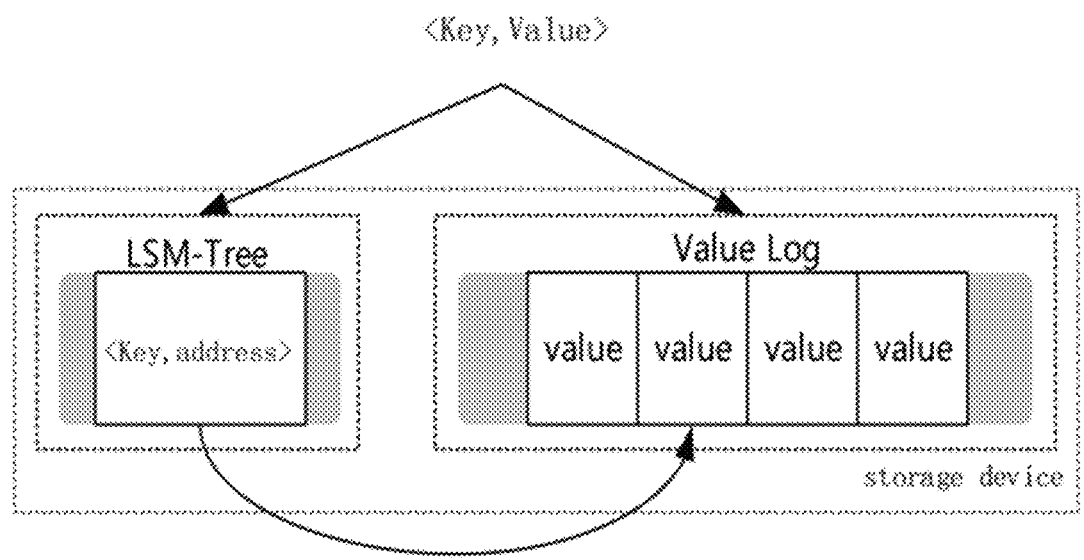
FIG. 2 illustrates a schematic diagram of a process for storing data using a Key-Value separation method, according to one or more embodiments.

FIG. 2 illustrates a schematic diagram of a process for storing data using the KV separation method according to one or more embodiments. Referring to FIG. 2, this method separates Keys and Values in KV pairs (a KV pair may be expressed as <Key, Value>) from each other, stores only the Keys in the storage device in an orderly manner based on the LSM-Tree mechanism, and stores the Values in a Value Log file in the storage device separately. Compaction operations are performed only on the Keys and related information (for example, a Key-address pair (which may be expressed as <Key, address>)) and the Values are not directly involved in a compaction processing. By this KV separation manner, the reading and writing amplification and the amount of disk queries may be reduced. However, since the Values are stored sequentially, and the consecutive Keys and corresponding Values are scattered in different locations in the Log file, so it is necessary to additionally read corresponding Values at random in the Log file when reading data, which may lead to a data read delay.

A data compaction method and device proposed by the present disclosure may not only alleviate a problem for CPU resource competition when performing compaction processing, but also reduce requirement for data transmission bandwidth.

Hereinafter, for the convenience of describing the present disclosure, a host and a Samsung SmartSSD may be described as an example. It should be understood by those skilled in the art that the storage device described herein may be any storage device having a computing unit and a storage unit, and that the host may be any electronic device having data processing capability.

Figure 3:
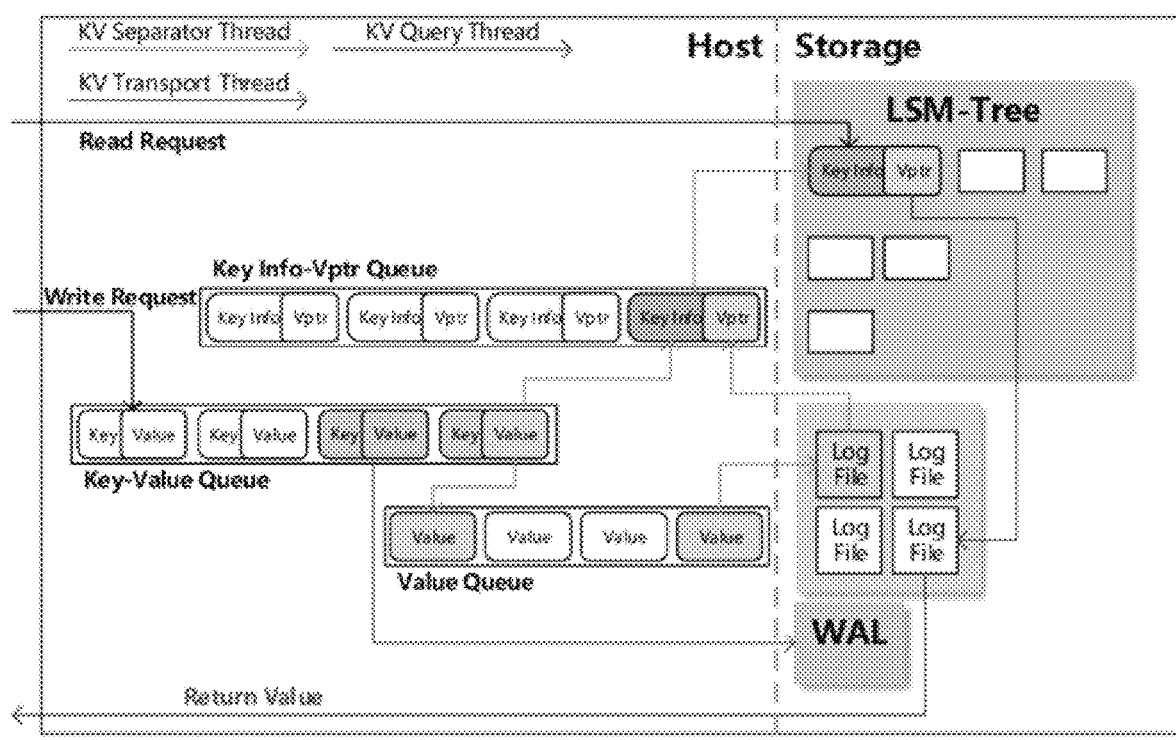
FIG. 3 illustrates a schematic diagram of a Log Structured Merge Tree (LSM-Tree) based data access method according to one or more embodiments.

FIG. 3 illustrates a schematic diagram of an LSM-Tree based data access method according to one or more embodiments.

Referring to FIG. 3, in response to receiving a write request for a KV pair, a host (e.g., via a KV Transport Thread) transfers the KV pair to a Write Ahead Log (WAL) file in a storage device (e.g., a SmartSSD) to ensure persistence of the written data. At the same time, the host (e.g., via a KV separation thread) stores Value of the KV pair in a Log file of the storage device according to size of the Key of the KV pair. There is only one active Log file in the storage device, and when the one Log file exceeds a preset size, a new file is created as a new Log file.

Subsequently, the host (e.g., via a KV separator Thread) stores Key information (including a value of the Key and a valid flag bit) and a pointer (including the number of the log file, a offset address of the stored Value and space size of the Value) to a storage address of the Value in the storage device as a Key-address pair (which may be expressed as <Key infor, Vptr>) in the storage device based on the LSM-Tree, wherein the Vptr indicates the storage address of the Value in the storage device. Specifically, the Key-address pair is stored in a memory table (memtable) file of a cache, and it is determined whether the memtable file triggers a drop disk operation, and if the drop disk operation is triggered, the data in the memtable file is transferred to an SSTable file of the storage device to be stored, and if not, a write operation ends.

It should be understood by those skilled in the art that each SSTable file includes a data block and an index block, wherein indexes in each index block correspond to data in a data block corresponding to the each index block, i.e., each element (i.e., Key-address pair) in the data block of the SSTable file has its own corresponding index.

In response to receiving a read request for a Key, the host (e.g., via a KV Query Thread) first determines whether the Key is found in the memtable, and if not, looks up the Key from Key-address pairs in the levels of the LSM-Tree in storage units of the SmartSSD, and when the Key is found from the Key-address pairs, Value corresponding to the Key is looked up in Log files according to an address corresponding to the Key. Since Values are stored in the Log files according to sizes of Keys corresponding to the Values, it is possible to read the Values in order according to the sizes of the Keys instead of randomly reading the Values when reading the Values corresponding to consecutive Keys in the Log files, and thus costs for data transfer and inputs and outputs in the user mode and kernel mode may be reduced, and data read latency may be reduced.

Figure 4:
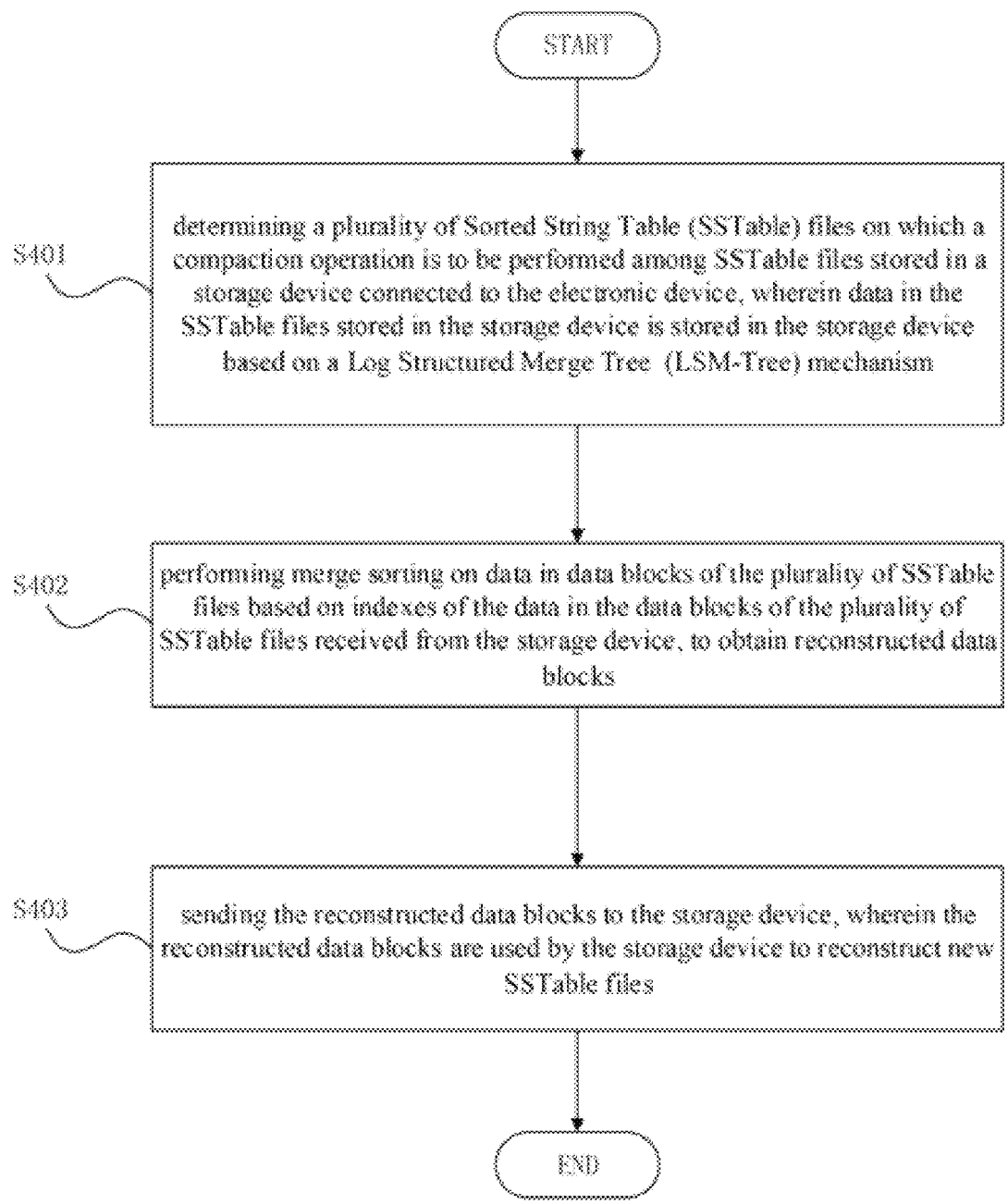
FIG. 4 illustrates a flowchart of a data compaction method according to according to one or more embodiments.

FIG. 4 illustrates a flowchart of a data compaction method according to one or more embodiments.

According to embodiments of the present disclosure, the method illustrated in FIG. 4 may be performed by an electronic device (e.g., a host) connected to the storage device.

Referring to FIG. 4, at operation S401, a plurality of sorted string table (SSTable) files, on which a compaction operation is to be performed, among SSTable files stored in a storage device connected to the electronic device are determined, wherein data in the SSTable files stored in the storage device is stored in the storage device based on a Log Structured Merge Tree (LSM-Tree) mechanism. Each SSTable file includes a data block and an index block, and indexes in each index block correspond to data in a data block corresponding to the each index block.

It should be understood by those skilled in the art that data stored in the SSTable files may be KV pairs stored based on the LSM-Tree mechanism, or may be Key-address pairs based on the LSM-Tree mechanism which is stored after KV separation.

At operation S402, merge sorting is performed on data in data blocks of the plurality of SSTable files based on indexes of the data in the data blocks of the plurality of SSTable files received from the storage device to obtain reconstructed data blocks.

As an example, the indexes of the data in the data blocks of the plurality of SSTable files may be obtained by parsing index blocks of the plurality of SSTable files by the storage device.

As an example, the storage device may be a SmartSSD including a storage unit and a computing unit, the SSTable files stored in the storage device are stored in the storage unit, and the indexes of the data in the data blocks of the plurality of SSTable files may be obtained by parsing the index blocks of the plurality of SSTable files by the computing unit.

Figure 5:
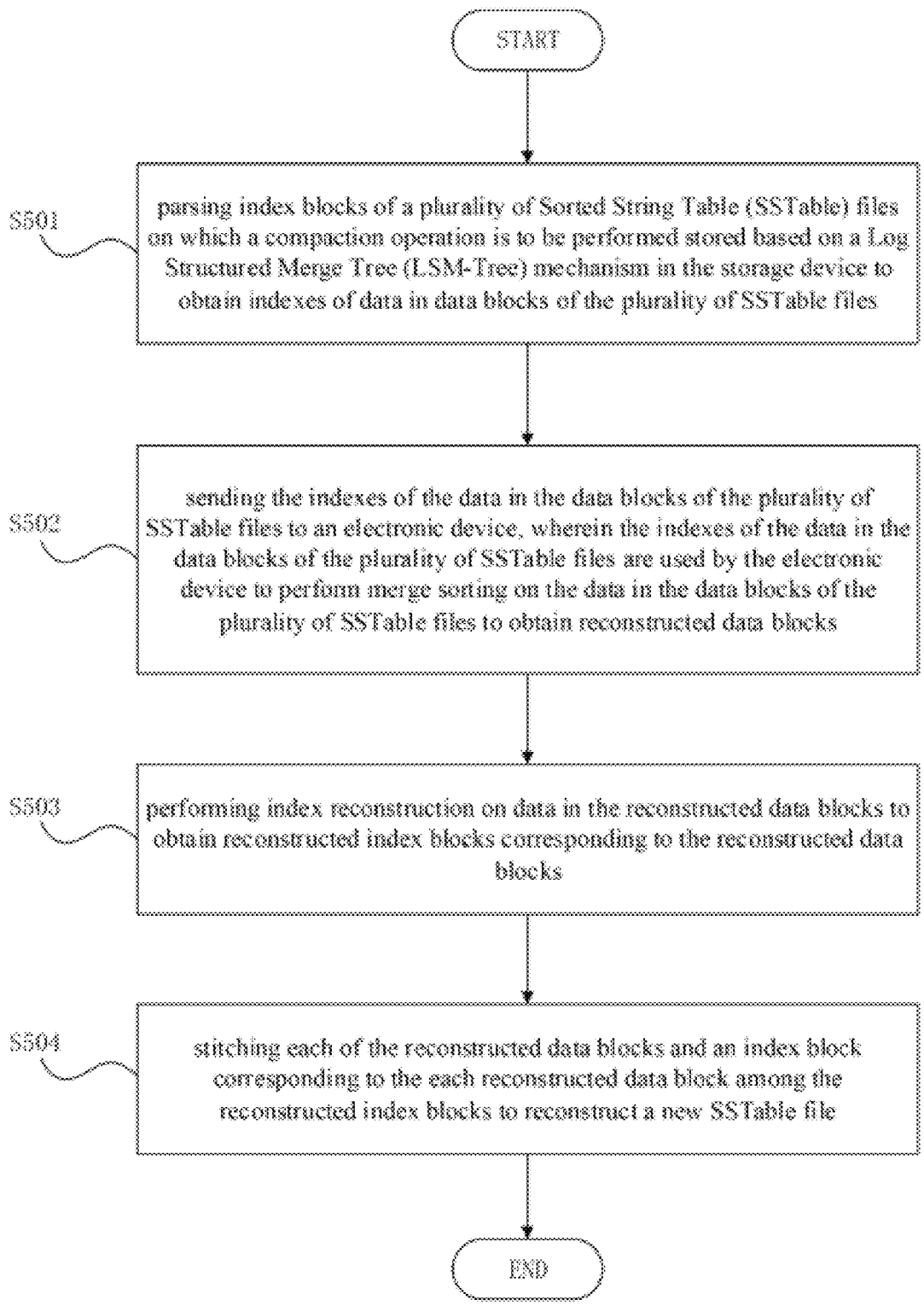
FIG. 5 illustrates a flowchart of a data compaction method according to one or more embodiments.

FIG. 5 illustrates a flowchart of a data compression method according to one or more embodiments.

The steps shown in FIG. 5 may be performed by a storage device (e.g., an SSD) connected to an electronic device (e.g., a host).

Referring to FIG. 5, at operation S501, index blocks of a plurality of SSTable files, which is stored based on a Log Structured Merge Tree (LSM-Tree) mechanism in the storage device and on which a compaction operation is to be performed, are parsed to obtain indexes of data in data blocks of the plurality of SSTable files.

At operation S502, the indexes of the data in the data blocks of the plurality of SSTable files are sent to an electronic device, wherein the indexes of the data in the data blocks of the plurality of SSTable files are used by the electronic device to perform merge sorting on the data in the data blocks of the plurality of SSTable files to obtain reconstructed data blocks.

As an example, operation S502 may include parsing the data blocks of the plurality of SSTable files to obtain the data in the data blocks of the plurality of SSTable files, performing the merge sorting on the data in the data blocks of the plurality of SSTable files based on the indexes of the data in the data blocks of the plurality of SSTable files, and reconstructing data obtained through the merge sorting into data blocks according to a format of a data block.

Referring back to FIG. 4, at operation S403, the reconstructed data blocks are sent to the storage device. By sending the reconstructed data blocks to the storage device, index reconstruction on the reconstructed data blocks may be performed by the storage device.

Referring back to FIG. 5, at operation S503, index reconstruction on data in the reconstructed data blocks is performed to obtain reconstructed index blocks corresponding to the reconstructed data blocks.

At operation S504, each of the reconstructed data blocks and an index block corresponding to the each reconstructed data block among the reconstructed index blocks are stitched to reconstruct a new SSTable file.

As an example, the storage device may be a SmartSSD including a computing unit and a storage unit, and S501, S503 and 504 may be performed by the computing unit.

As an example, in response to receiving the KV pair, the electronic device may store a Value of a KV pair in a storage unit of the storage device according to size of a Key of the KV pair, and store a Key-address pair consisting of the Key of the KV pair and an address in a form of an SSTable file in the storage device based on the LSM-Tree mechanism, wherein the address is a storage addresses of the Value in the storage device, and data in each of the data blocks of the plurality of SSTable files is a Key-address pair.

According to embodiments of the present disclosure, an amount of data transferred from the storage device to the host is reduced by the Key-Value separation technique, thereby improving the efficiency of compaction operations.

According to embodiments of the present disclosure, the electronic device performs parsing only on the data blocks and does not need to parse the index blocks, and thus the computing pressure on the electronic device (e.g., a host CPU) may be relieved. In addition, the index parsing and index reconstruction operations, which take less CPU time in compaction operations, is offloaded to the storage device, and this may make full use of resources of a computing chip in the storage device and avoid delays in compaction operations due to insufficient resources when all compaction operations are offloaded to the storage device.

Figure 6:
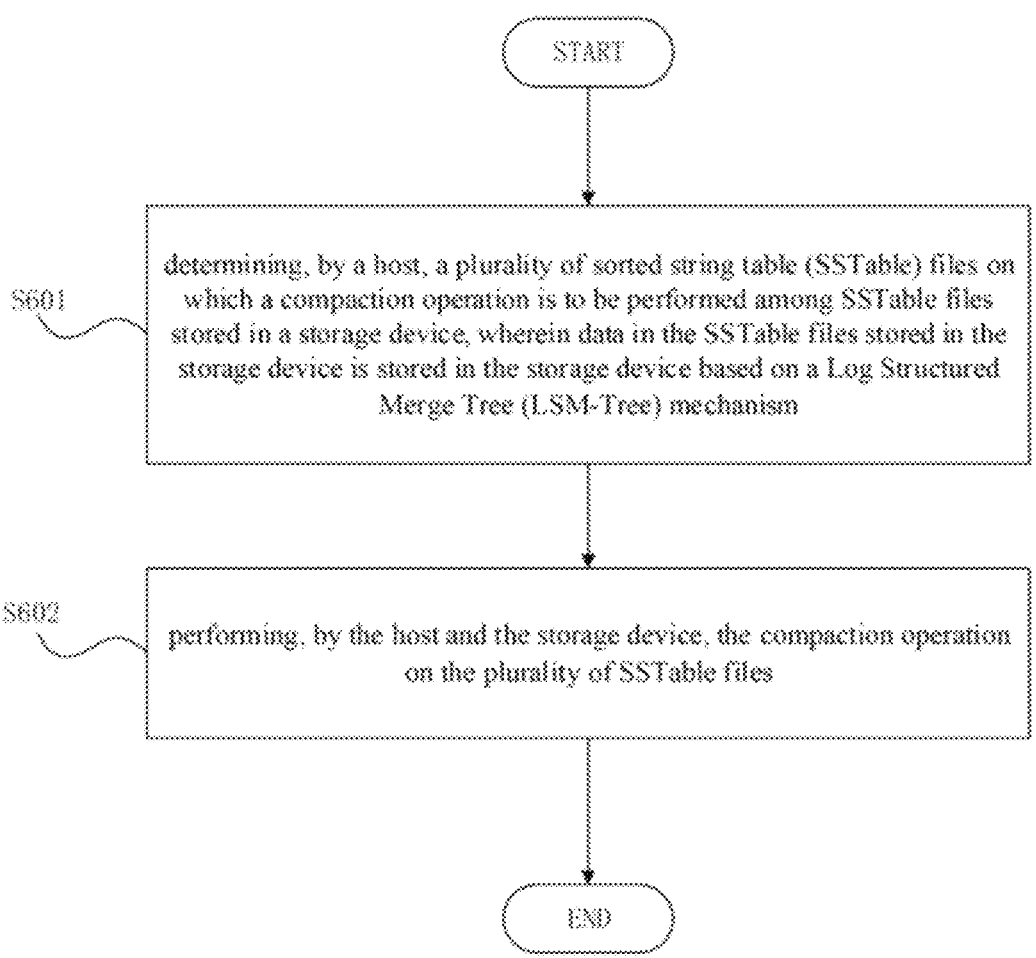
FIG. 6 illustrates a flowchart of a data compaction method according to one or more embodiments.

FIG. 6 illustrates a flowchart of a data compaction method according to one or more embodiments.

Referring to FIG. 6, at operation S601, a plurality of sorted string table (SSTable) files on which a compaction operation is to be performed among SSTable files stored in a storage device are determined by a host, wherein data in the SSTable files stored in the storage device is stored in the storage device based on a Log Structured Merge Tree (LSM-Tree) mechanism.

At operation S602, the compaction operation on the plurality of SSTable files is performed by the host and the storage device.

Since the compaction operation is performed by the host and the processor in concert, rather than by the host alone, the computing pressure on the CPU at the host side when performing the compaction processing may be relieved.

As an example, operation S602 may include: parsing, by the storage device, index blocks of a plurality of SSTable files to obtain indexes of the index blocks, wherein each SSTable file includes a data block and an index block, and indexes in each index block correspond to data in a data block corresponding to the each index block; performing, by the host, merge sorting on data in data blocks of the plurality of SSTable files based on the obtained indexes to obtain reconstructed data blocks; performing, by the storage device, index reconstruction on data in the reconstructed data blocks to obtain reconstructed index blocks corresponding to the reconstructed data blocks; stitching, by the storage device, each of the reconstructed data blocks and an index block corresponding to the each reconstructed data block among the reconstructed index blocks to reconstruct a new SSTable file.

According to embodiments of the present disclosure, the index parsing and index reconstruction operations, which take less CPU time in compaction operations, is offloaded to the storage device, which may make full use of resources of a computing chip in the storage device and avoid delays in compaction operations due to insufficient resources when all compaction operations are offloaded to the storage device.

As an example, the performing, by the host, merge sorting on data in data blocks of the plurality of SSTable files based on the obtained indexes to obtain reconstructed data blocks may include: parsing, by the host, the data blocks of the plurality of SSTable files to obtain the data in the data blocks of the plurality of SSTable files; performing, by the host, the merge sorting on the data in the data blocks of the plurality of SSTable files based on the indexes in the index blocks and reconstructing, by the host, data obtained through the merge sorting into data blocks according to a format of a data block.

As an example, both the data block and the index block may be parsed by a storage device (e.g., a computing unit of the storage device), and indexes and data obtained after parsing are sent to a host which performs merge sorting on the data obtained by the parsing based on the indexes obtained by the parsing.

As another example, the data blocks may be parsed by the storage device, the index blocks may be parsed by the host, and the host then performs merge sorting on the parsed data based on the parsed indexes.

Figure 7:
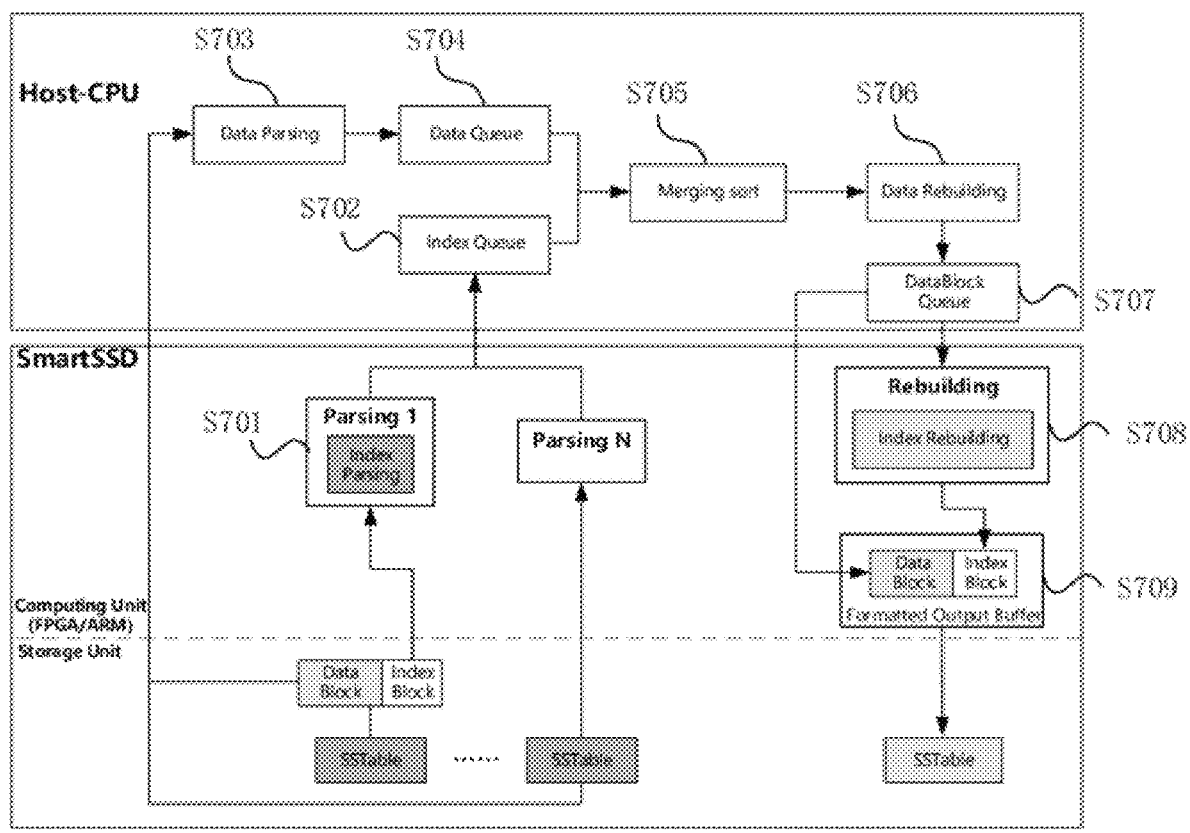
FIG. 7 illustrates a schematic diagram of a process for implementing a compaction operation by a host and a storage device in concert according to one or more embodiments.

FIG. 7 illustrates a schematic diagram of a process of implementing a compaction operation by the host and the storage device in collaboration, according to one or more embodiments.

Referring to FIG. 7, at operation S701, a computing unit of a SmartSSD is responsible for parsing index blocks of SSTable files transferred from a storage unit of the SmartSSD to transferring parsed index information to the host (or CPU of the host).

At operation S702, the host stores the index information obtained by the parsing into an index queue.

At operation S703, data blocks of the SSTable files transferred from the storage unit are parsed by the host to obtain data in the data blocks.

At operation S704, the data obtained by the parsing is stored to a data queue by the host.

At operation S705, merge sorting is performed on the data in the data queue by the host based on the indexes in the index queue. Specifically, index information is first obtained in the index queue, data corresponding to the index information is obtained in the data queue based on the index information, and then the obtained data is merged to retain the latest data and the retained data is sorted based on sizes of Keys of the retained data.

At operation S706, check data is added to the sorted data by the host to reconstruct data blocks according to a format of a data block.

At operation S707, the reconstructed data blocks is stored to a data block queue by the host.

At operation S708, the computing unit of the SmartSSD obtains relevant information of each data of a data block queue, reconstructs index information corresponding to the each data based on the relevant information, and when the index information of all data of the data block has been reconstructed, corresponding check data is added to form an index block corresponding to the data block.

At operation S709, an index block and a data block corresponding to the index block are stitched together and stored in a Formatted Output Buffer by the computing unit, and when an amount of data stored in the Formatted Output Buffer reaches a threshold value of the SSTable, the data stored in the Formatted Output Buffer are combined into one SSTable file to be stored in the storage unit.

Those skilled in the art should understand that performing order of operations S701-S709 is not limited, and at least one of operations S701-S709 may be performed in parallel.

According to an embodiment of the present disclosure, since data transfer bandwidth between the computing unit and the storage unit of the SmartSSD is wider than data transfer bandwidth between the storage unit and the host, the index blocks may be quickly transferred to the computing unit to be parsed during an execution of the compaction operation, instead of having to wait until they are transferred to the host to be parsed. In addition, a data amount of the parsed indexes is smaller than a data amount of the unparsed index blocks, and therefore, transferring the parsed index data to the host may occupy less data transfer bandwidth compared to transferring the index blocks to the host.

As an example, Log files with a high amount of invalid data may be periodically recycled. Specifically, a Garbage Properties file may be customized to record a garbage data value for each Log file. Specifically, whenever a compaction operation is performed, if a Value corresponding to a Key is deleted, the garbage data value of the Log file corresponding to the Value is added by one, and when the garbage data value of a certain Log file reaches a specified threshold, garbage collection is performed on the certain Log file in the background.

Specifically, for a Log file on which the garbage collection is to be performed, whether a corresponding Key for each Value in the Log file exists is queried to determine whether the Value is invalidated, and when it is determined that a Key corresponding to a Value does not exist, it is determined that the Value is invalid, and the non-invalid Values are stored in a new Log file, and new address information of the non-invalid Values in the new Log file is updated to the LSM-Tree.

The data compaction methods according to embodiments of the present disclosure are described above with reference to FIGS. 1 to 7, and an electronic device, a storage device, and a system according to embodiments of the present disclosure are described below with reference to FIGS. 8 to 14.

Figure 8:
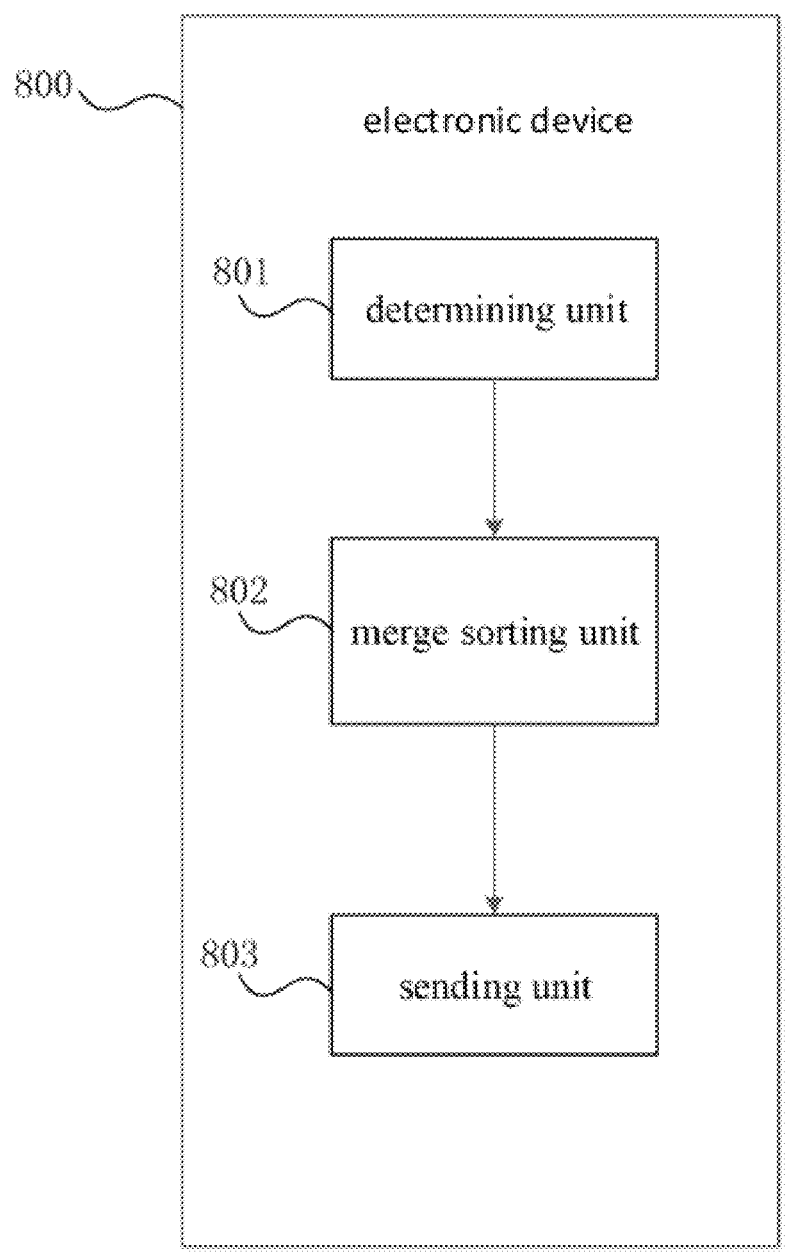
FIG. 8 illustrates a block diagram of a structure of an electronic device according to one or more embodiments.

FIG. 8 illustrates a block diagram of a structure of an electronic device according to one or more embodiments.

Referring to FIG. 8, the electronic device 800 may include a determination unit 801, a merge sorting unit 802, and a sending unit 803. It should be understood by those skilled in the art that the electronic device 800 may additionally include other components, and that at least one of components included in the electronic device 800 may be combined or divided.

As an example, the determining unit 801 may be configured to determine a plurality of sorted string table (SSTable) files, on which a compaction operation is to be performed, among SSTable files stored in a storage device connected to the electronic device, wherein data in the SSTable files stored in the storage device is stored in the storage device based on a Log Structured Merge Tree (LSM-Tree) mechanism, and each SSTable file includes a data block and an index block, wherein indexes in each index block correspond to data in a data block corresponding to the each index block.

As an example, the merge sorting unit 802 may be configured to perform merge sorting on data in data blocks of the plurality of SSTable files based on indexes of the data in the data blocks of the plurality of SSTable files received from the storage device to obtain reconstructed data blocks.

As an example, the merge sorting unit 802 may be configured to parse the data blocks of the plurality of SSTable files to obtain the data in the data blocks of the plurality of SSTable files, perform the merge sorting on the data in the data blocks of the plurality of SSTable files based on the indexes of the data in the data blocks of the plurality of SSTable files, and reconstruct data obtained through the merge sorting into data blocks according to a format of a data block.

As an example, the indexes of the data in the data blocks of the plurality of SSTable files are obtained by parsing index blocks of the plurality of SSTable files by the storage device.

As an example, the storage device may be a SmartSSD including a storage unit and a computing unit, the SSTable files stored in the storage device are stored in the storage unit, the indexes of the data in the data blocks of the plurality of SSTable files are obtained by parsing the index blocks of the plurality of SSTable files by the computing unit.

As an example, the sending unit 803 may be configured to send the reconstructed data blocks to the storage device, wherein the reconstructed data blocks are used by the storage device to reconstruct new SSTable files.

As an example, the electronic device 800 may further include: a storing unit configured to store a value of a key-value pair in a storage unit of the storage device according to size of a key of the key-value pair and store a key-address pair consisting of the key of the key-value pair and an address in a form of an SSTable file in the storage device based on the LSM-Tree mechanism, in response to receiving the key-value pair, wherein the address is a storage addresses of the value in the storage device, wherein data in each of the data blocks of the plurality of SSTable files is a key-address pair.

Figure 9:
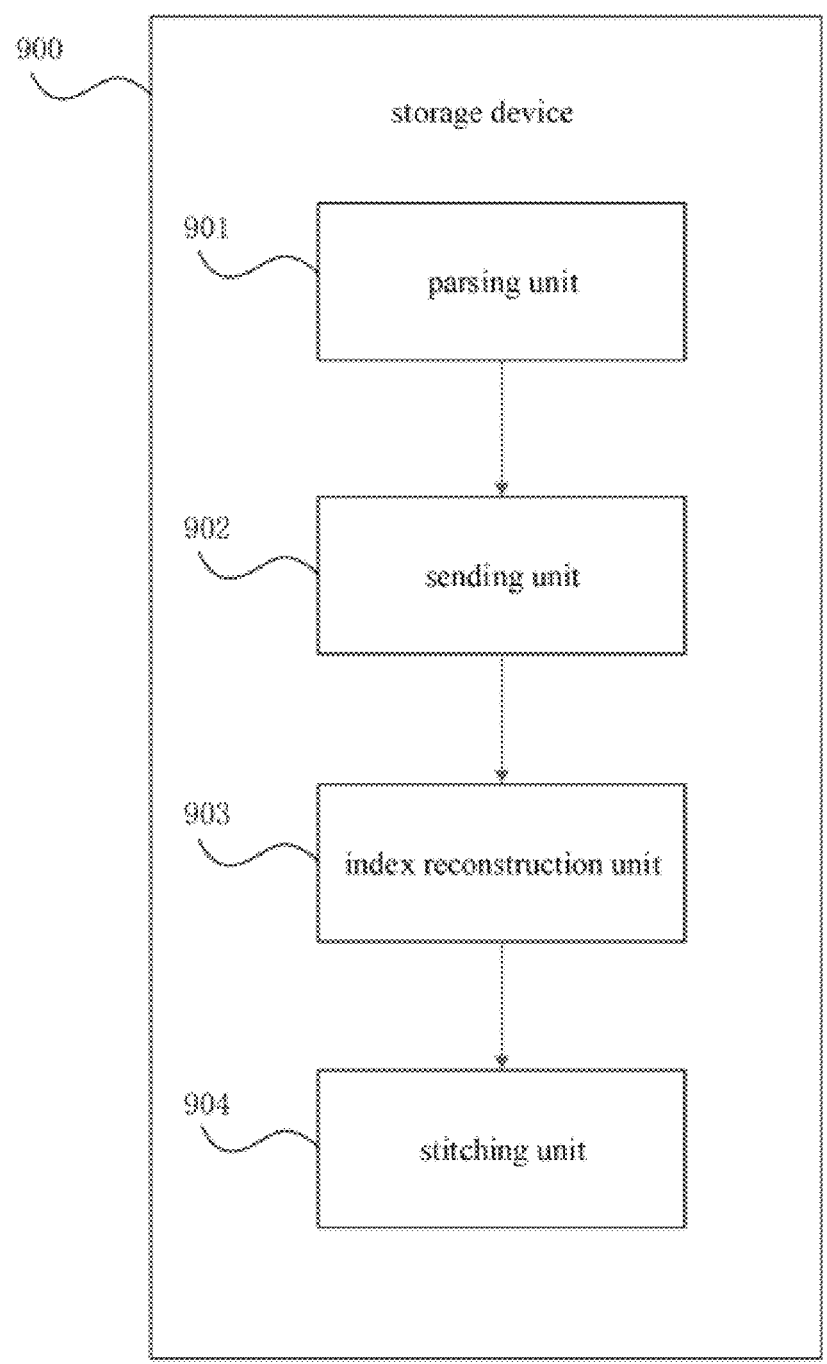
FIG. 9 illustrates a block diagram of a structure of a storage device according to one or more embodiments.

FIG. 9 illustrates a block diagram of a structure of a storage device according to one or more embodiments.

Referring to FIG. 9, the storage device 900 may include a parsing unit 901, a sending unit 902, an index reconstruction unit 903, and a stitching unit 904. It should be understood by those skilled in the art that the storage device 900 may additionally include other components, and at least one of components included in the storage device 900 may be combined or divided.

As an example, the parsing unit 901 may be configured to parse index blocks of a plurality of SSTable files, which is stored based on a Log Structured Merge Tree (LSM-Tree) mechanism and on which a compaction operation is to be performed, in the storage device to obtain indexes of data in data blocks of the plurality of SSTable files.

As an example, the sending unit 902 may be configured to send the indexes of the data in the data blocks of the plurality of SSTable files to an electronic device, wherein the indexes of the data in the data blocks of the plurality of SSTable files are used by the electronic device to perform merge sorting on the data in the data blocks of the plurality of SSTable files to obtain reconstructed data blocks.

As an example, the index reconstruction unit 903 may be configured to perform index reconstruction on data in the reconstructed data blocks to obtain reconstructed index blocks corresponding to the reconstructed data blocks.

As an example, the stitching 904 may be configured to stitch each of the reconstructed data blocks and an index block corresponding to the each reconstructed data block among the reconstructed index blocks to reconstruct a new SSTable file.

As an example, the storage device may be a SmartSSD including a computing unit and a storage unit, the computing unit may include the parsing unit 901, the index reconstruction unit 903 and the stitching 904.

According to embodiments of the present disclosure, there is provided a data compaction system, the system may include the electronic device 800 and the storage device 900 as described above.

According to another aspect of embodiments of the present disclosure, there is provided a computer readable storage medium storing a computer program that when executed by a processor causes the processor to implement the data compaction method performed by the electronic device as described above and causes a storage device connected to the processor to implement the data compaction performed by the storage device as described above method.

Figure 10:
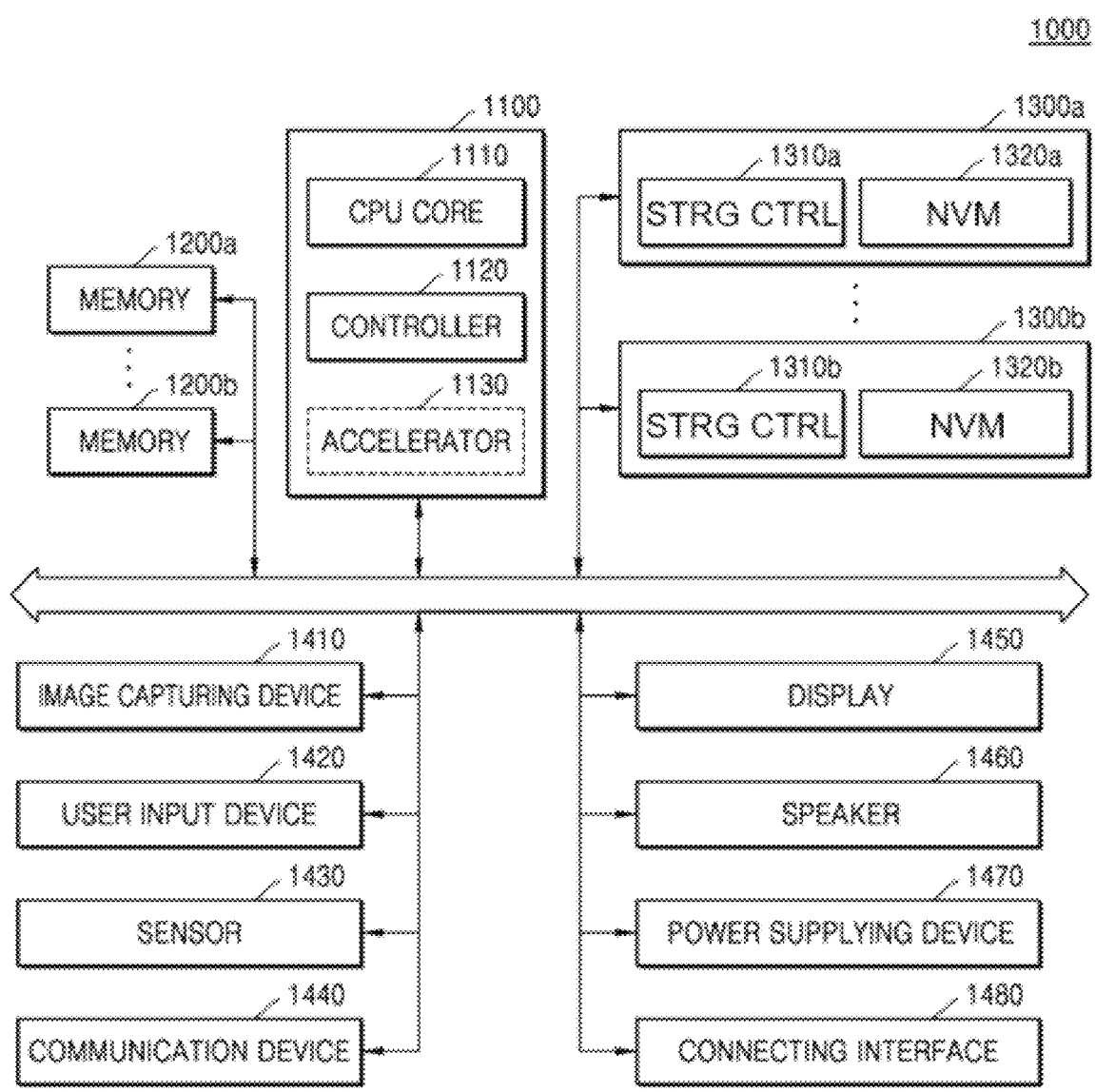
FIG. 10 is a schematic diagram of an electronic device according to one or more embodiments.

FIG. 10 is a schematic diagram of a system 1000 according to one or more embodiments.

The system 1000 of FIG. 10 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 10 is not necessarily limited to the mobile system and may be a PC, a laptop computer, a server, a media player, or an automotive device (e.g., a navigation device).

Referring to FIG. 10, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, stage-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory) s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to an exemplary embodiment of the present disclosure, there is provided an electronic device, including: a memory (for example, memories 1200a and 1200b of FIG. 10) storing one or more instructions; storage devices (for example, storage devices 1300a and 1300b of FIG. 10); and a main processor (for example, main processor 1100 of FIG. 10) configured to execute the one or more instructions to cause the host processor to perform the data compaction method performed by the electronic device as described above and to cause the storage devices to perform the data compaction method performed by the storage device as described above.

Figure 11:
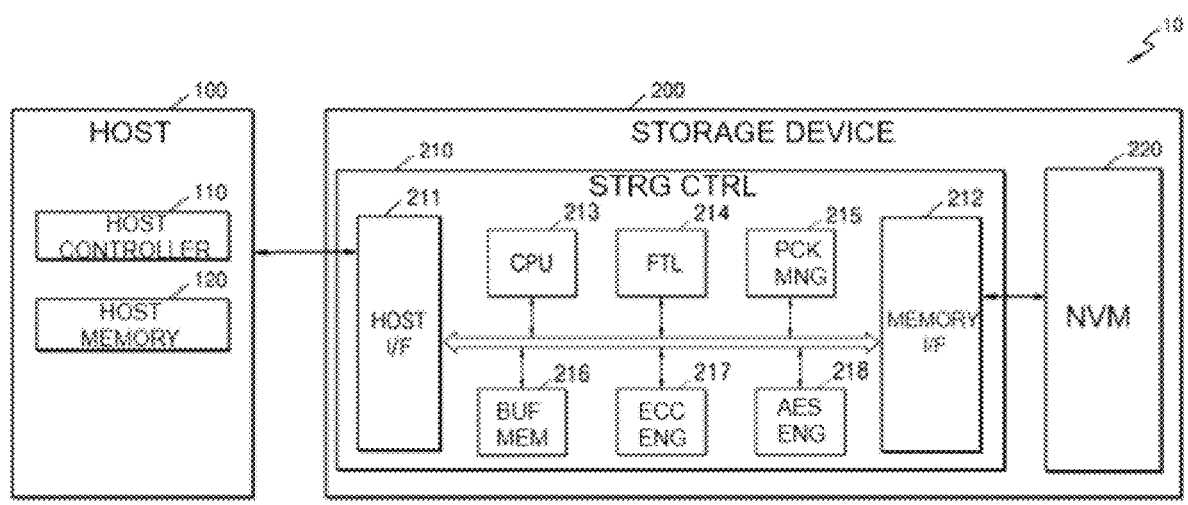
FIG. 11 is a block diagram of a host storage system according to one or more embodiments.

FIG. 11 is a block diagram of a host storage system 10 according to one or more embodiments.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

According to an embodiment of the present disclosure, a host storage system is provided, including: a host (for example, host 100 of FIG. 11) including a host memory (for example, host memory 110 of FIG. 11) and a host controller (for example, host controller 120 of FIG. 11); and a storage device (for example, storage device 200 of FIG. 11), wherein the host memory stores instructions that when executed by the host controller cause the host controller to perform the data compaction method performed by the electronic device as described above and cause the storage device to perform the data compaction method performed by the storage device as described above.

Figure 12:
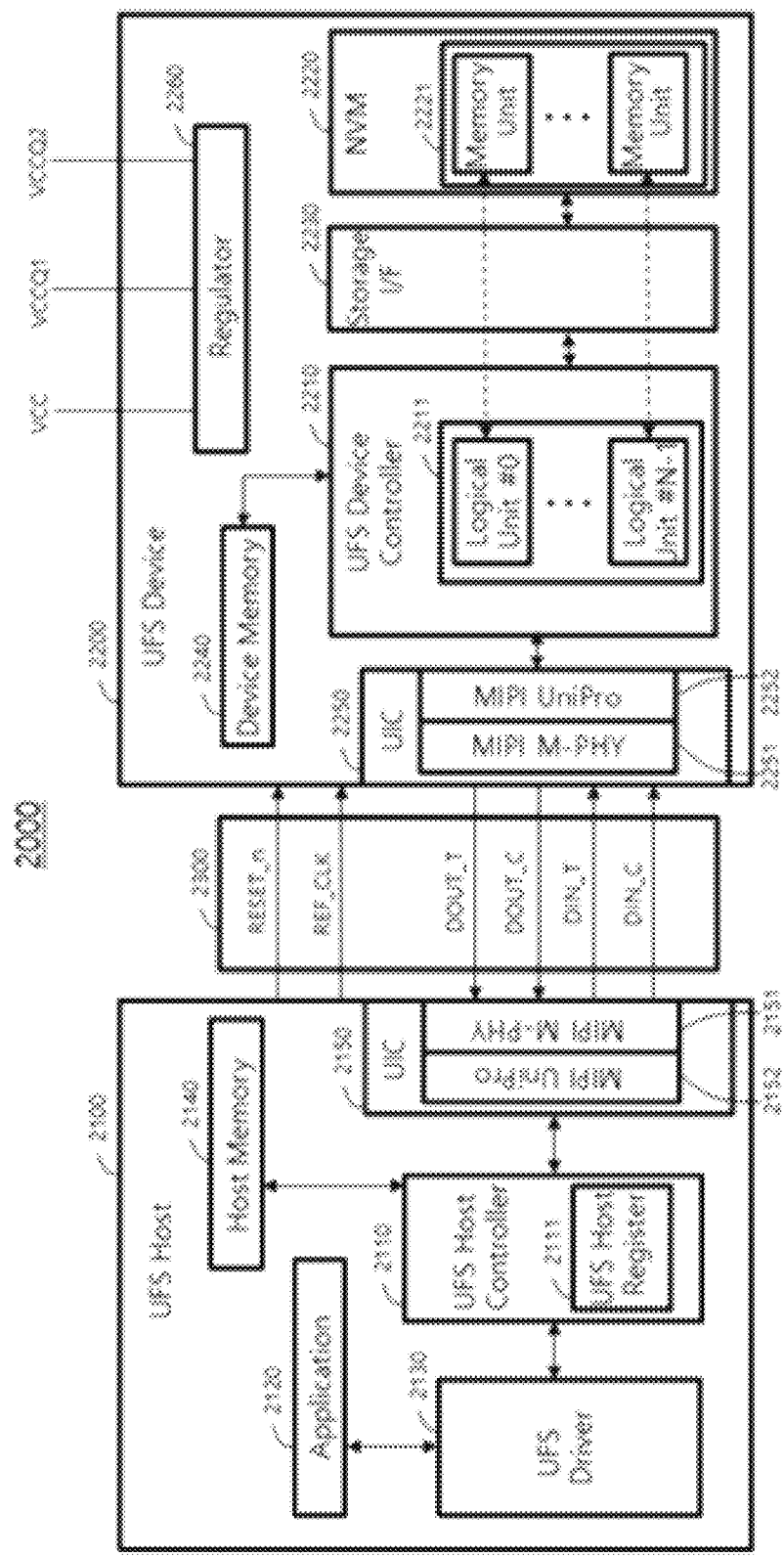
FIG. 12 is a block diagram of a Universal Flash Storage (UFS) system according to one or more embodiments.

FIG. 12 is a block diagram of a UFS system 2000 according to one or more embodiments.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 10 may also be applied to the UFS system 2000 of FIG. 12 within a range that does not conflict with the following description of FIG. 12.

Referring to FIG. 12, the UFS host 2100 may be connected to the UFS device 2200 through the UFS interface 2300. When the main processor 1100 of FIG. 10 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 10. The UFS device 2200 may correspond to the storage device 1300a and 1300b of FIG. 10, and a UFS device controller 2210 and an NVM 2220 may respectively correspond to the storage controllers 1310a and 1310b and the NVMs 1320a and 1320b of FIG. 10.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHZ, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 12, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 12, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

According to an embodiment of the present disclosure, a UFS system is provided, including: a UFS host (for example, UFS host 2100 of FIG. 12) configured to perform the data compaction method performed by the electronic device as described herein; a UFS device (for example, UFS device 2200 of FIG. 12) configured to perform the data compaction method performed by the storage device as described herein; and a UFS interface (for example, UFS interface 2300 of FIG. 12), used for a communication between the UFS device and the UFS host.

Figure 13:
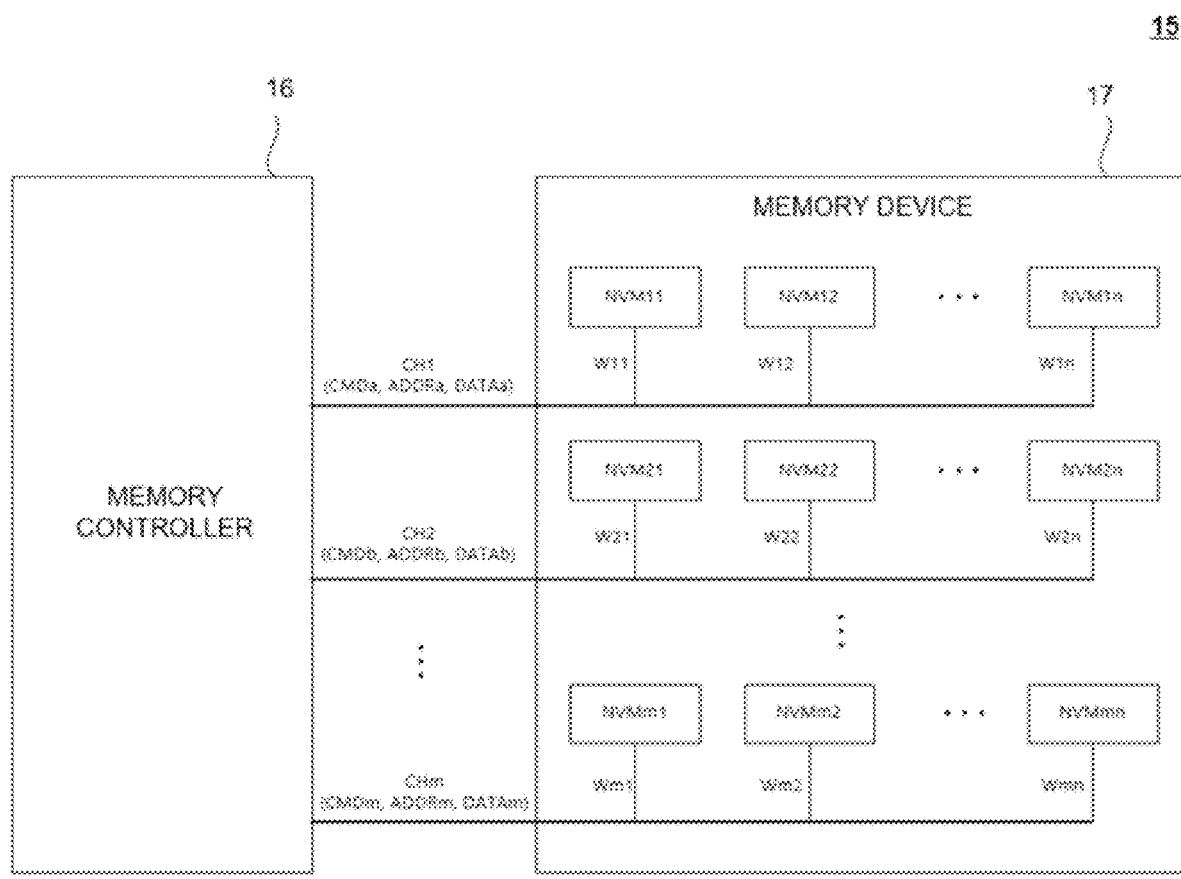
FIG. 13 is a block diagram of a storage system according to one or more embodiments.

FIG. 13 is a block diagram of a memory system 15 according to one or more embodiments. Referring to FIG. 13, the memory system 15 may include a memory device 17 and a memory controller 16. The memory system 15 may support a plurality of channels CH1 to CHm, and the memory device 17 may be connected to the memory controller 16 through the plurality of channels CH1 to CHm. For example, the memory system 15 may be implemented as a storage device, such as an SSD.

The memory device 17 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1$n$ may be connected to a first channel CH1 through ways W11 to W1$n$, and the NVM devices NVM21 to NVM2$n$ may be connected to a second channel CH2 through ways W21 to W2$n$. In an example embodiment, each of the NVM devices NVM11 to NVMmn may be implemented as an arbitrary memory unit that may operate according to an individual command from the memory controller 16. For example, each of the NVM devices NVM11 to NVMmn may be implemented as a chip or a die, but the inventive concept is not limited thereto.

The memory controller 16 may transmit and receive signals to and from the memory device 17 through the plurality of channels CH1 to CHm. For example, the memory controller 16 may transmit commands CMDa to CMDm, addresses ADDRa to ADDRm, and data DATAa to DATAm to the memory device 17 through the channels CH1 to CHm or receive the data DATAa to DATAm from the memory device 17.

The memory controller 16 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 16 may select the NVM device NVM11 from the NVM devices NVM11 to NVM1$n$ connected to the first channel CH1. The memory controller 16 may transmit the command CMDa, the address ADDRa, and the data DATAa to the selected NVM device NVM11 through the first channel CH1 or receive the data DATAa from the selected NVM device NVM11.

The memory controller 16 may transmit and receive signals to and from the memory device 17 in parallel through different channels. For example, the memory controller 16 may transmit a command CMDb to the memory device 17 through the second channel CH2 while transmitting a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control all operations of the memory device 17. The memory controller 16 may transmit a signal to the channels CH1 to CHm and control each of the NVM devices NVM11 to NVMmn connected to the channels CH1 to CHm. For instance, the memory controller 16 may transmit the command CMDa and the address ADDRa to the first channel CH1 and control one selected from the NVM devices NVM11 to NVM1$n$.

Each of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 16.

Although FIG. 13 illustrates an example in which the memory device 17 communicates with the memory controller 16 through m channels and includes n NVM devices corresponding to each of the channels, the number of channels and the number of NVM devices connected to one channel may be variously changed.

According to an embodiment of the present disclosure, there provides a storage system including: a memory device (for example, memory device 17) configured to perform the data compaction method performed by the storage device as described herein; and a memory controller (for example, memory controller 16) configured to perform the data compaction method performed by the electronic device as described herein.

Figure 14:
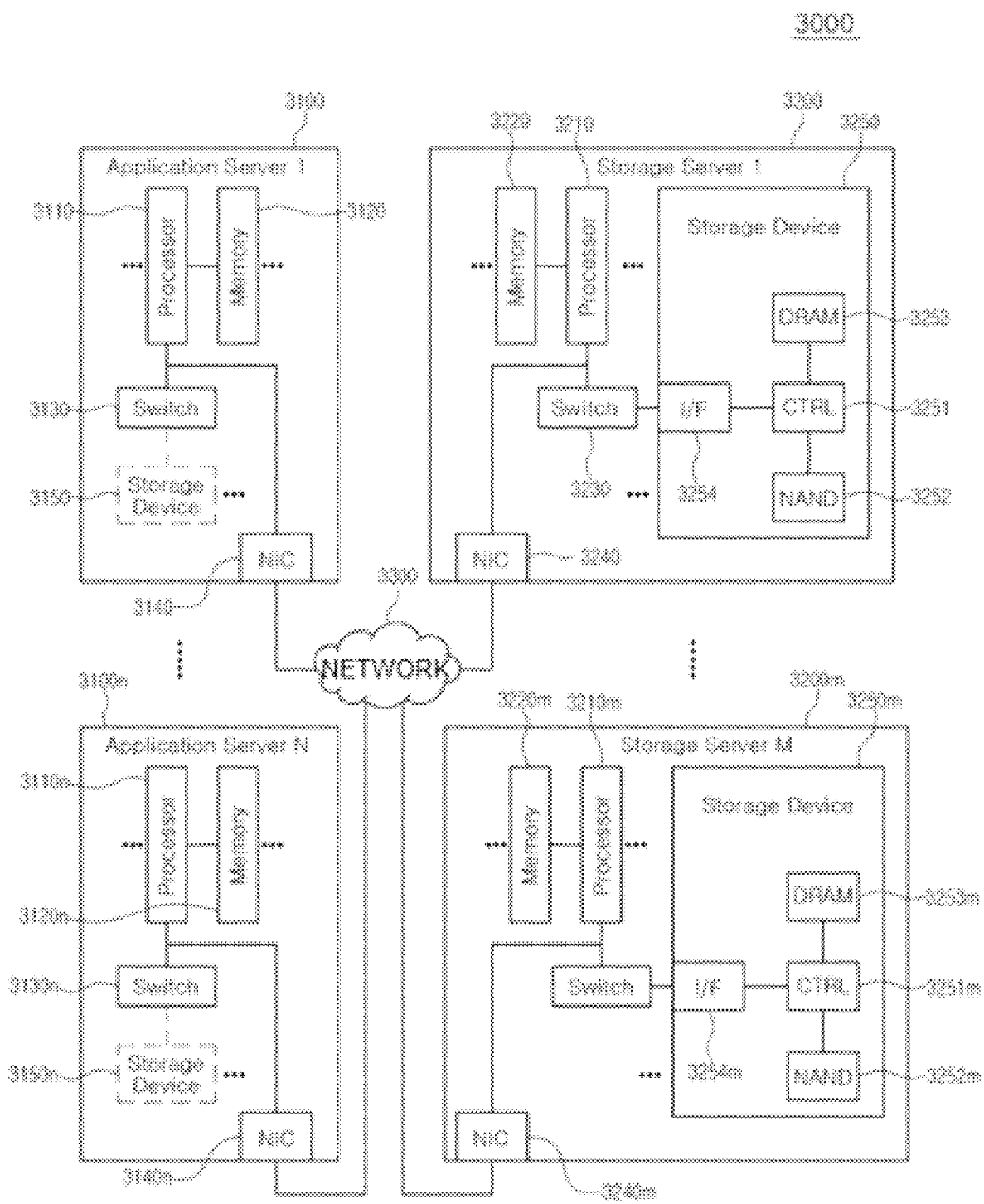
FIG. 14 is a schematic diagram of a data center to which storage devices are applied according to one or more embodiments.

FIG. 14 is a diagram of a data center 3000 to which a storage device is applied according to one or more embodiments.

Referring to FIG. 14, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100$n$ and storage servers 3200 to 3200$m$. The number of application servers 3100 to 3100$n$ and the number of storage servers 3200 to 3200$m$ may be variously selected according to embodiments. The number of application servers 3100 to 3100$n$ may be different from the number of storage servers 3200 to 3200$m$.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100$n$ may communicate with the storage servers 3200 to 3200$m$ through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200$m$ may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

According to an embodiment of the present disclosure, a data center system (for example, data center 3000) is provided, including: a plurality of application servers (for example, application servers 3100-3100*n*), wherein each of the plurality of application servers is configured to perform the data compaction method performed by the electronic device as described herein; and a plurality of storage servers (for example, storage servers 3200-3200*m*), wherein each of the storage servers includes a storage device, and wherein each of the plurality of storage servers is configured to perform the data compaction method performed by the storage device as described herein.

According to an embodiment of the present disclosure, there may be provided a computer-readable storage medium storing instructions, when executed by at least one processor, causing the at least one processor to perform the data compaction method according to the present disclosure. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

According to an embodiment of the present disclosure, there may be provided a computer program product, wherein instructions in the computer program product may be executed by a processor of a computer device to implement the data compaction methods described herein.

At least one of the components, elements, modules, units, or the like (collectively "components" in this paragraph) represented by a block or an equivalent indication (collectively "block") in the above embodiments including the drawings may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Those skilled in the art will easily think of other embodiments of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as exemplary only, and the actual scope and spirit of the present disclosure are pointed out by the following claims and their equivalents.

What is claimed is:

1. A data compaction method comprising:
   determining, by an electronic device, a plurality of Sorted String Table (SSTable) files on which a compaction operation is to be performed among SSTable files stored in a storage device connected to the electronic device, wherein data in the SSTable files stored in the storage device is stored based on a Log Structured Merge Tree (LSM-Tree) mechanism;
   based on receiving the plurality of SSTable files from the storage device, performing, by the electronic device, merge sorting on data in data blocks of the plurality of SSTable files based on indexes of the data in the data blocks of the plurality of SSTable files, to obtain reconstructed data blocks; and
   sending, by the electronic device, the reconstructed data blocks to the storage device, wherein the reconstructed data blocks are used by the storage device to obtain reconstructed SSTable files,
   wherein each SSTable file comprises a data block and an index block, and indexes in each index block correspond to data in the data block corresponding to the index block.

2. The method of claim 1, wherein the performing the merge sorting on the data in the data blocks of the plurality of SSTable files comprises:
   parsing the data blocks of the plurality of SSTable files to obtain the data in the data blocks of the plurality of SSTable files;
   performing the merge sorting on the data in the data blocks of the plurality of SSTable files based on the indexes of the data in the data blocks of the plurality of SSTable files; and
   reconstructing data obtained through the merge sorting into data blocks according to a data block format.

3. The method of claim 2, wherein the indexes of the data in the data blocks of the plurality of SSTable files are obtained by parsing each index block of the plurality of SSTable files by the storage device.

4. The method of claim 3, wherein the storage device is a SmartSSD comprising a storage unit and a computing unit, the SSTable files stored in the storage device are stored in the storage unit, and the indexes of the data in the data blocks of the plurality of SSTable files are obtained by parsing each index block of the plurality of SSTable files by the computing unit.

5. The method of claim 2, further comprising:
   based on receiving a key-value pair, storing a value of the key-value pair in a storage unit of the storage device according to a size of a key of the key-value pair, and storing a key-address pair comprising the key of the key-value pair and an address in a form of an SSTable file in the storage device based on the LSM-Tree mechanism, wherein the address is a storage addresses of the value in the storage device, and
   wherein the data in each of the data blocks of the plurality of SSTable files is a key-address pair.

6. The data compaction method of claim 1, wherein the storage device is a universal flash storage (UFS) device.

7. A data compaction method, comprising:
   parsing, by a storage device, index blocks of a plurality of Sorted String Table (SSTable) files on which a compaction operation is to be performed, the plurality of SSTable files stored based on a Log Structured Merge Tree (LSM-Tree) mechanism in the storage device, to obtain indexes of data in data blocks of the plurality of SSTable files;
   sending, by the storage device, the indexes of the data in the data blocks of the plurality of SSTable files to an electronic device to perform merge sorting on the data in the data blocks of the plurality of SSTable files and obtain reconstructed data blocks;
   performing, by the storage device, index reconstruction on data in the reconstructed data blocks to obtain reconstructed index blocks corresponding to the reconstructed data blocks; and stitching, by the storage device, each of the reconstructed data blocks and a corresponding index block among the reconstructed index blocks to obtain a reconstructed SSTable file.

8. The method of claim 7, wherein the storage device is a SmartSSD comprising a computing unit and a storage unit, and
wherein the computing unit is configured to perform the parsing the index blocks of the plurality of SSTable files, the performing the index reconstruction on the data in the reconstructed data blocks, and the stitching each of the reconstructed data blocks and the corresponding index block.

9. An electronic device comprising:
a determining unit configured to determine a plurality of Sorted String Table (SSTable) files on which a compaction operation is to be performed among SSTable files stored in a storage device, wherein data in the SSTable files stored in the storage device is stored based on a Log Structured Merge Tree (LSM-Tree) mechanism;
a merge sorting unit configured to perform merge sorting on data in data blocks of the plurality of SSTable files based on indexes of the data in the data blocks of the plurality of SSTable files received from the storage device, to obtain reconstructed data blocks; and
a sending unit configured to send the reconstructed data blocks to the storage device, wherein the reconstructed data blocks are used by the storage device to obtain reconstructed SSTable files,
wherein each SSTable file comprises a data block and an index block, wherein indexes in each index block correspond to data in a data block corresponding to the index block.

10. The electronic device of claim 9, wherein the merge sorting unit is further configured to:
parse the data blocks of the plurality of SSTable files to obtain the data in the data blocks of the plurality of SSTable files;
perform the merge sorting on the data in the data blocks of the plurality of SSTable files based on the indexes of the data in the data blocks of the plurality of SSTable files; and
reconstruct data obtained through the merge sorting into data blocks according to a data block format.

11. The electronic device of claim 10, wherein the indexes of the data in the data blocks of the plurality of SSTable files are obtained by parsing each index block of the plurality of SSTable files by the storage device.

12. The electronic device of claim 11, wherein the storage device is a Smart SSD comprising a storage unit and a computing unit, the SSTable files stored in the storage device are stored in the storage unit, and the indexes of the data in the data blocks of the plurality of SSTable files are obtained by parsing each index block of the plurality of SSTable files by the computing unit.

13. The electronic device of claim 10, further comprising:
a storing unit configured to store a value of a key-value pair in a storage unit of the storage device according to a size of a key of the key-value pair, and store a key-address pair comprising the key of the key-value pair and an address in a form of an SSTable file in the storage device based on the LSM-Tree mechanism, wherein the address is a storage addresses of the value in the storage device, and
wherein the data in each of the data blocks of the plurality of SSTable files is a key-address pair.

14. The electronic device of claim 9, wherein the electronic device further comprises the storage device comprising:
a parsing unit configured to parse index blocks of the plurality of SSTable files on which the compaction operation is to be performed, to obtain indexes of data in data blocks of the plurality of SSTable files;
a sending unit configured to send the indexes of the data in the data blocks of the plurality of SSTable files to the electronic device, to perform merge sorting on the data in the data blocks of the plurality of SSTable files and obtain reconstructed data blocks;
an index reconstruction unit configured to perform index reconstruction on data in the reconstructed data blocks to obtain reconstructed index blocks corresponding to the reconstructed data blocks; and
a stitching unit configured to stitch each of the reconstructed data blocks and a corresponding index block among the reconstructed index blocks to obtain a reconstructed SSTable files.

15. The electronic device of claim 9, wherein the storage device is SmartSSD.

16. The electronic device of claim 9, wherein the electronic device and the storage device constitute a universal flash storage (UFS) system, wherein the electronic device is a UFS host, and wherein the storage device is a UFS device, wherein the electronic device is connected to the storage device through a UFS interface.

17. The electronic device of claim 9, wherein the electronic device and the storage device constitute a data center system, wherein the electronic device is included in an application server, and wherein the storage device is included in a storage server.

* * * * *